US009965145B2

(12) United States Patent
Baird (10) Patent No.: US 9,965,145 B2
(45) Date of Patent: May 8, 2018

(54) EXPANDABLE USER INTERFACE MENU (71) Applicant: Adobe Systems Incorporated, San Jose, CA (US)

(72) Inventor: Peter J. Baird, Arlington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 551 days.

(21) Appl. No.: 14/172,555

(22) Filed: Feb. 4, 2014

(65) Prior Publication Data

US 2014/0157205 A1    Jun. 5, 2014

Related U.S. Application Data (63) Continuation of application No. 12/004,819, filed on Dec. 21, 2007, now Pat. No. 8,689,139.

(51) Int. Cl.
*G06F 3/0482* (2013.01)

(52) U.S. Cl.
CPC ................. *G06F 3/0482* (2013.01)

(58) Field of Classification Search
CPC ................................... G06F 3/0482
USPC ........................................ 715/843
See application file for complete search history.

(56) References Cited

U.S. PATENT DOCUMENTS

| 5,520,191 A * | 5/1996 | Karlsson ............. A61B 5/0006 600/512 |
| 5,603,034 A | 2/1997 | Swanson |
| 5,726,688 A | 3/1998 | Siefert et al. |
| 5,784,583 A * | 7/1998 | Redpath ................... G06F 8/38 715/841 |
| 5,801,703 A * | 9/1998 | Bowden ............... G06F 3/0482 715/841 |
| 5,838,965 A | 11/1998 | Kavanagh et al. |
| 5,999,175 A * | 12/1999 | Nalder ............... H04N 1/00352 358/1.18 |
| 6,084,585 A | 7/2000 | Kraft et al. |
| 6,208,340 B1 * | 3/2001 | Amin ................... G06F 1/1626 715/808 |
| 6,229,539 B1 | 5/2001 | Morcos et al. |
| 6,580,442 B1 * | 6/2003 | Singh ................... G06F 3/0488 345/173 |
| 6,661,437 B1 * | 12/2003 | Miller ................. G06F 3/04817 348/E5.006 |
| 6,796,492 B1 | 9/2004 | Gatto |
| 6,925,608 B1 | 8/2005 | Neale et al. |
| 7,120,874 B2 | 10/2006 | Shah et al. |
| 7,146,578 B2 | 12/2006 | Kim |
| 7,610,564 B1 | 10/2009 | Pfohe et al. |
| 7,640,517 B2 | 12/2009 | Moehrle |
| 7,860,946 B1 | 12/2010 | Bulleit et al. |
| 8,225,208 B2 | 7/2012 | Sprang |
| 2002/0138584 A1 | 9/2002 | Fujimoto et al. |
| 2003/0023347 A1 * | 1/2003 | Konno ................... B25J 9/1671 700/245 |

(Continued)

*Primary Examiner* — Doon Chow
*Assistant Examiner* — Conrad Pack
(74) *Attorney, Agent, or Firm* — Finch & Maloney PLLC (57) ABSTRACT Expandable user interface menu techniques are described, including displaying a menu having a menu item, receiving an input indicating selection of the menu item, and expanding the menu, based on one or more parameters associated with the menu item, to present a structure configured to receive another input associated with the menu item, the menu item remaining displayed while the menu is expanded.

14 Claims, 7 Drawing Sheets

(56) References Cited

U.S. PATENT DOCUMENTS

| | | |
|---|---|---|
| 2003/0122868 A1* | 7/2003 | Aggarwal ............ G06F 3/0482 |
| | | 715/760 |
| 2003/0146937 A1 | 8/2003 | Lee |
| 2004/0021647 A1* | 2/2004 | Iwema ................. G06F 3/0488 |
| | | 345/179 |
| 2004/0135819 A1 | 7/2004 | Maa |
| 2004/0148307 A1* | 7/2004 | Rempell ................... G06F 8/20 |
| 2005/0076312 A1 | 4/2005 | Gardner et al. |
| 2005/0160353 A1 | 7/2005 | Conrad et al. |
| 2005/0229134 A1* | 10/2005 | Hetzel ................ G06F 17/5077 |
| | | 257/773 |
| 2005/0262236 A1 | 11/2005 | Schachtely et al. |
| 2005/0278728 A1* | 12/2005 | Klementiev ........ G06F 9/45512 |
| | | 719/328 |
| 2006/0067577 A1* | 3/2006 | Marggraff ............ G06F 3/0317 |
| | | 382/187 |
| 2006/0161864 A1* | 7/2006 | Windl ................... G06F 3/0482 |
| | | 715/810 |
| 2006/0184878 A1 | 8/2006 | Argo et al. |
| 2006/0242557 A1 | 10/2006 | Nortis, III |
| 2007/0006101 A1 | 1/2007 | Michaels |
| 2007/0192705 A1 | 8/2007 | Lee |
| 2007/0198949 A1 | 8/2007 | Rummel |
| 2007/0250794 A1 | 10/2007 | Miura et al. |
| 2008/0072177 A1 | 3/2008 | Santos et al. |
| 2008/0201637 A1* | 8/2008 | Shirasaki ............. G06F 3/0482 |
| | | 715/705 |
| 2009/0144651 A1 | 6/2009 | Sprang et al. |
| 2009/0192849 A1* | 7/2009 | Hughes .................... G06F 8/10 |
| | | 705/7.11 |

* cited by examiner

EXPANDABLE USER INTERFACE MENU

This is a continuation of U.S. patent application Ser. No. 12/004,819 (filed 21 Dec. 2007), the entire disclosure of which is hereby incorporated by reference herein.

FIELD OF THE INVENTION

Examples relate generally to software and user interfaces. More specifically, expandable user interface menu techniques and implementations are described.

BACKGROUND

User interface menus often include menu items that use additional user input. For example, a user interface menu, such as one typically labeled "File," often includes a "Save As . . . " menu item, which uses a user to enter a filename. Other examples of menu items that use additional user input include "Open . . . ," "Print . . . ," "Find . . . ," and "Replace . . . ." The ellipses in a menu item typically signify that additional user input in used.

Conventionally techniques for gathering additional user input typically involve one or more "popup" windows or displays that disengage from an initiating user interface menu. For example, when a user selects a "Save As . . . " menu item from a menu, the menu typically disappears. Then, a window pops up for the user to (1) enter a filename and (2) either confirms the user's action (e.g., clicking on a "Save" button to confirm saving a file) or cancels the user's action (e.g., clicking on a "Cancel" button), In some situations, such as selecting a "Print . . . " menu item to print a file, a second, third, and more windows may appear or "pop up" to receive additional user input (e.g., for specifying printer properties or customizing document formatting). However, there are problems associated with conventional techniques.

In some conventional techniques, a new popup window typically disrupts the user experience by visually interrupting a user's attention and mentally interrupting user focus on a given task. Conventional popup windows demand user interaction or intervention (e.g., clicking on one or more buttons in a popup window to close it) before allowing a user to return to the task at hand or to interact with previously popped up windows. For example, if providing additional user input to a menu item results in several popup windows appearing in succession, a user must close all displayed popup windows before being able to return to an application user interface. Further, popup windows use up more space on a display screen than a user interface menu. Conventional displays become visually "cluttered" with popup windows.

Another problem with conventional techniques is the denial of the ability to access other menu items when a popup window appears. For example, a menu of font sizes typically includes options for selecting font sizes and an "Other Size . . . " menu item for a user to manually input a numerical value to specify a font size not appearing in the menu. However, when conventional solutions present a popup window to enter a font size, the font size menu typically disappears, preventing the selection of other items or options, limiting or altogether eliminating further user input.

Thus, a solution for providing user input without leaving the context of a given application without the limitations of conventional techniques is needed.

BRIEF DESCRIPTION OF THE FIGURES

Various examples are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Various examples of expandable user interface menus are described, including menu items, menu expansions, input controls, input data, or other user interface elements. Devices, computing systems, user interfaces, processes, methods, and programming instructions that implement various expandable user interface menus are also described. These and other techniques may be implemented in any applications, including those executed on a mobile device, that use one or more user interface menus. Various techniques for expandable user interface menu may be selectively implemented. In other examples, different techniques may be implemented differently and are not limited to the examples provided and described.

Figure 1A:
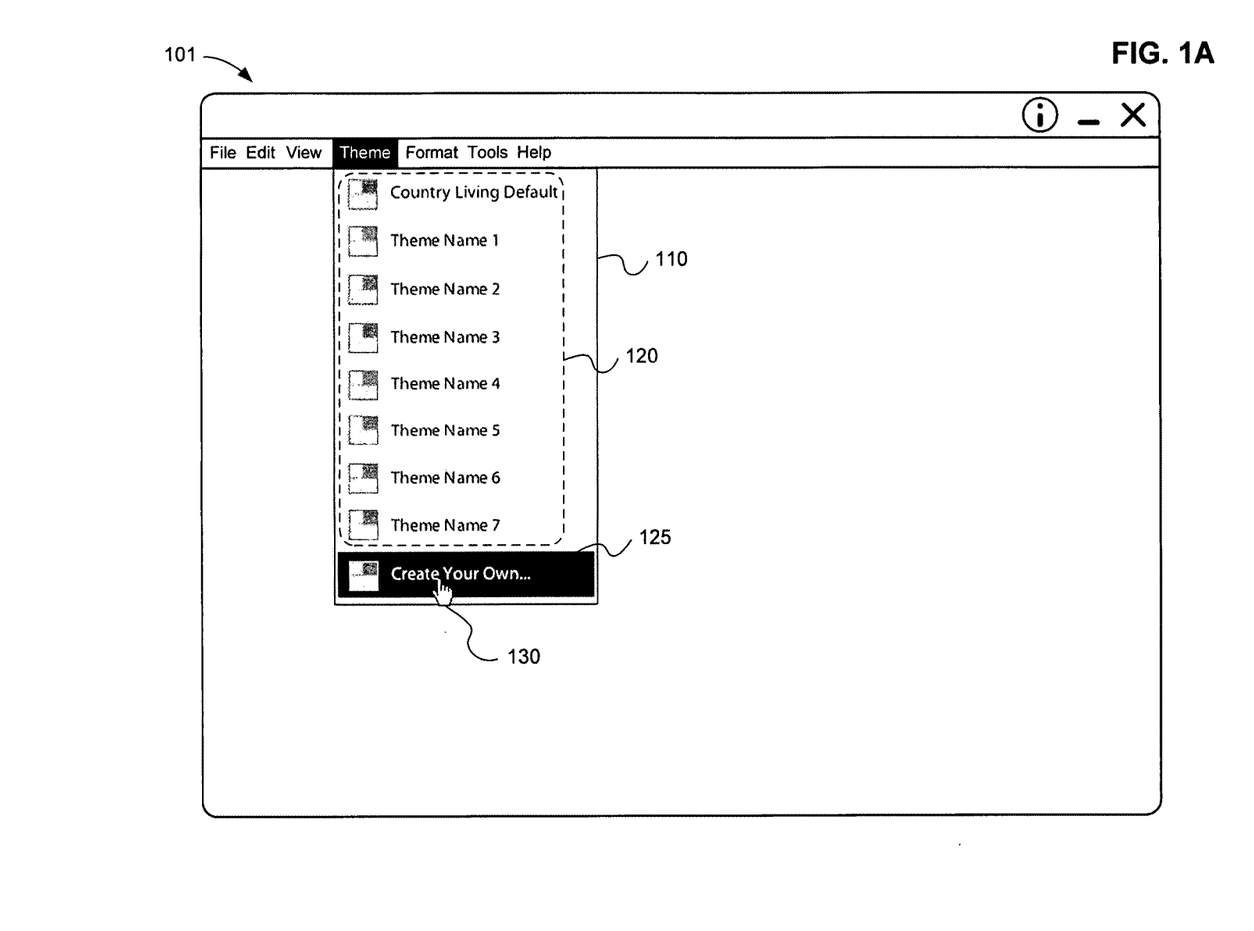
FIG. 1A illustrates an exemplary expandable user interface menu.

FIG. 1A illustrates an exemplary expandable user interface menu. Here, application window 101 shows user interface menu ("menu") 110 having menu items 120 and 125. A control pointer 130 is shown near menu item 125. Menu 110 is shown in a pre-expanded form.

Application window 101 may occupy a portion of a display screen (not shown) or the entire display screen. An application may implement any number of menus, including one or more submenus (e.g., menu 210 of FIG. 2). Here, menu 110 is shown near the top of application window 101. In some examples, menu 110 may be displayed anywhere in application window 101, such as near the left side, right side, bottom, or center of application window 101. Further, menu 110 may be moved to another location, within, overlapping, or outside application window 101.

In some examples, a menu, such as menu 110 may include any number of menu items, such as one, two, five, eight, 11, 18, 25, 40, 59 or more. Here, menu 110 is shown with nine menu items 120 and 125. Here, menu items 120 and 125 are shown in a vertical arrangement in menu 110. In some examples not shown, menu items 120 and 125 may be arranged differently, such as horizontally, following a curvature (e.g., an arc or circle), or in a combination of horizontal-vertical groups (e.g., arranging menu items vertically in each two or more groups and arranging the groups horizontally). In some examples, users may be allowed to configure menu 110 to add more menu items. Any of menu items 120 and 125 may be represented by a graphical element (e.g., an image, thumbnail, or icon), a textual element (e.g., one or more characters, symbols, or words), or a combination of both, as shown. Here, for illustration purposes, menu 110 and text associated with menu items 120 and 125 are shown in English. However, text in any language or in more than one language may be used in an expandable user interface menu.

Figure 2:
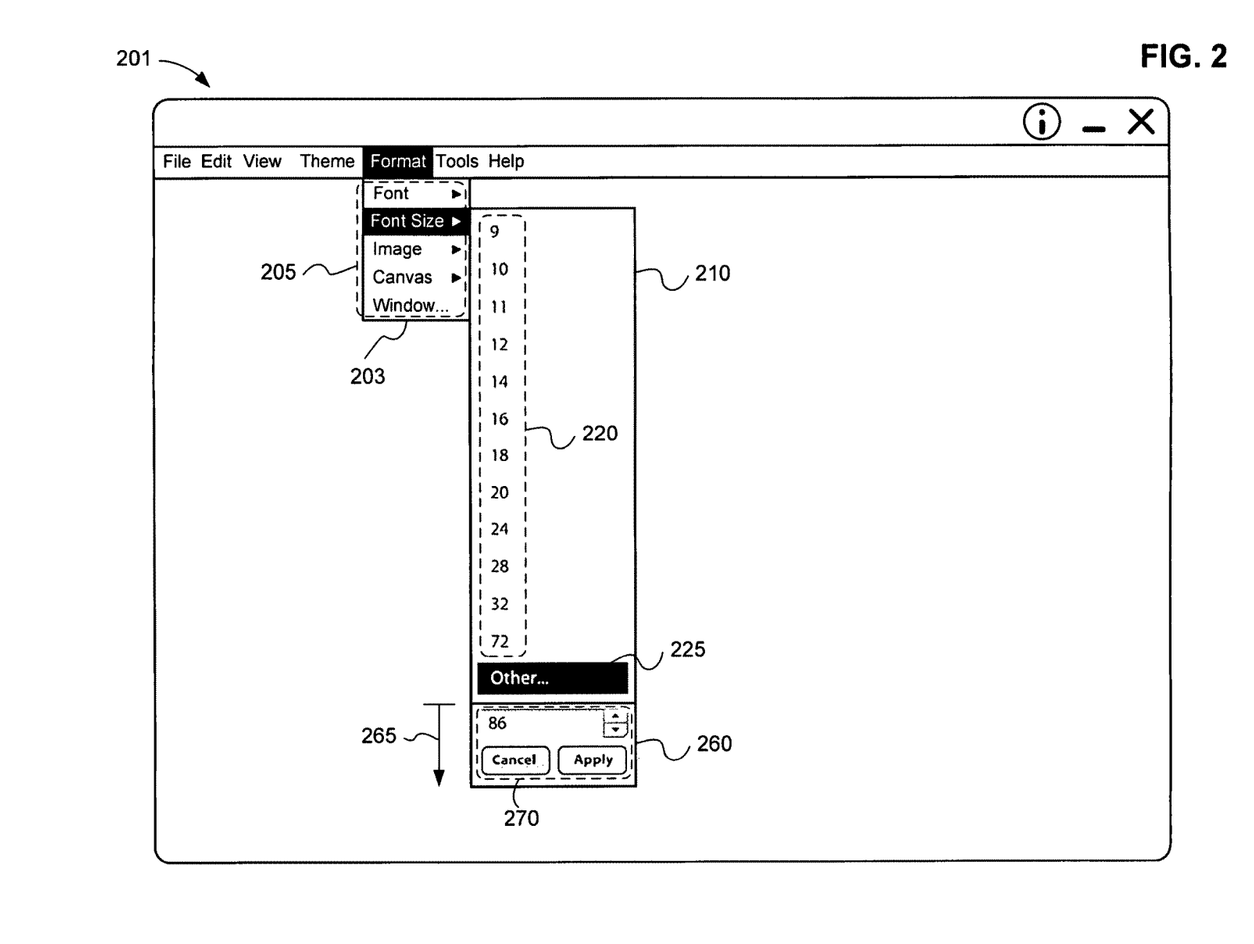
FIG. 2 illustrates an alternative exemplary expandable user interface menu.

In some examples, menu items 120 may be referred to as "action" menu items (i.e., an action or function is performed upon selection of a menu item). Menu item 125 and the like may be referred to as customizable menu items or "ellipses" menu items. Ellipses menu items may receive additional user input before an action or function is performed. In some examples, ellipses menu items (i.e., menu items customized with additional user input) may be indicated by including ellipses in the menu items. There may be other types of menu items. For example, a menu item may, upon selection, cause the display of another menu (i.e., a submenu), such as some of menu items 205 of FIG. 2. This type of menu items may be referred to as "submenu" menu items and may be indicated using a symbol (e.g., an arrow), as shown in the first four menu items 205 (FIG. 2). In some examples, ellipses or submenu menu items may include other signifying symbols or no signifying symbol. Any menu item in a menu, such as menu 101 (FIG. 1A), may be an action menu item, ellipses menu item, submenu menu item, or another type of menu item. A menu (e.g., menu 110) may have any combination of different types of menu items, including menu items of one or multiple types (i.e., ellipses, action, submenu, or other).

User interface elements, such as menu 110 and menu items 120 and 125 may be selected or activated via control pointer 130, other controls (not shown), or other methods. For example, a user may provide user input or data via one or more controls to select a menu (e.g., menu 110), submenu (e.g., menu 210 of FIG. 2), menu item (e.g., menu item 120 or 125), or another user interface element. As used herein, the term "control" refers generally to any input interface or mechanism. A control may be physically implemented (e.g., a key, button, mouse, trackball, touch screen, tablet, lever, switch, pen, and others) or virtually implemented, such as a graphical user interface ("GUI") control (e.g., a pointer, icon, button, box, checkbox, list box, or another GUI widget or element). In some examples, a control may be activated with a single action, such as a single click or keystroke. In other examples, activating a control may be performed with two or more actions (e.g., two or more keystrokes, clicks, or combination). In some examples, when a control is activated, a signal is generated. For example, activating a control may generate a signal to select a menu, select a menu item, expand a menu, or interface an input control.

A menu may be activated or selected using any methods. For example, a user may select or activate menu 110 (the "Theme" menu in application window 101) by clicking control pointer 130 on the word "Theme", by hovering control pointer 130 over the word "Theme", or by pressing a key or combination of keys on a keyboard ("keyboard shortcut"). The term "hovering," with respect to user interface, refers generally to moving a control (e.g., control pointer 130) over a widget or item (e.g., the word "Theme" or a menu item) and keeping the control over such widget or item for a period of time (e.g., a fraction of a second). Once activated, menu 110 is displayed showing menu items 120 and 125 for selection. In some examples, the selected menu may be de-selected or another menu may be selected.

A menu item may be selected, for example, when a control is activated, such as control pointer 130. For example, to select menu item 125, control pointer 130 may be clicked on menu item 125. In other examples, selecting menu item 125 may be achieved by hovering an element (e.g., control pointer 130) over menu item 125 for a predetermined period of time, such as a fraction of a second. In yet other examples, menu item (e.g., 125) may be selected by other methods or controls, such as a keyboard shortcut. Upon selecting an ellipses menu item, such as menu item 125, menu 110 expands to allow additional user input.

Figure 1B:
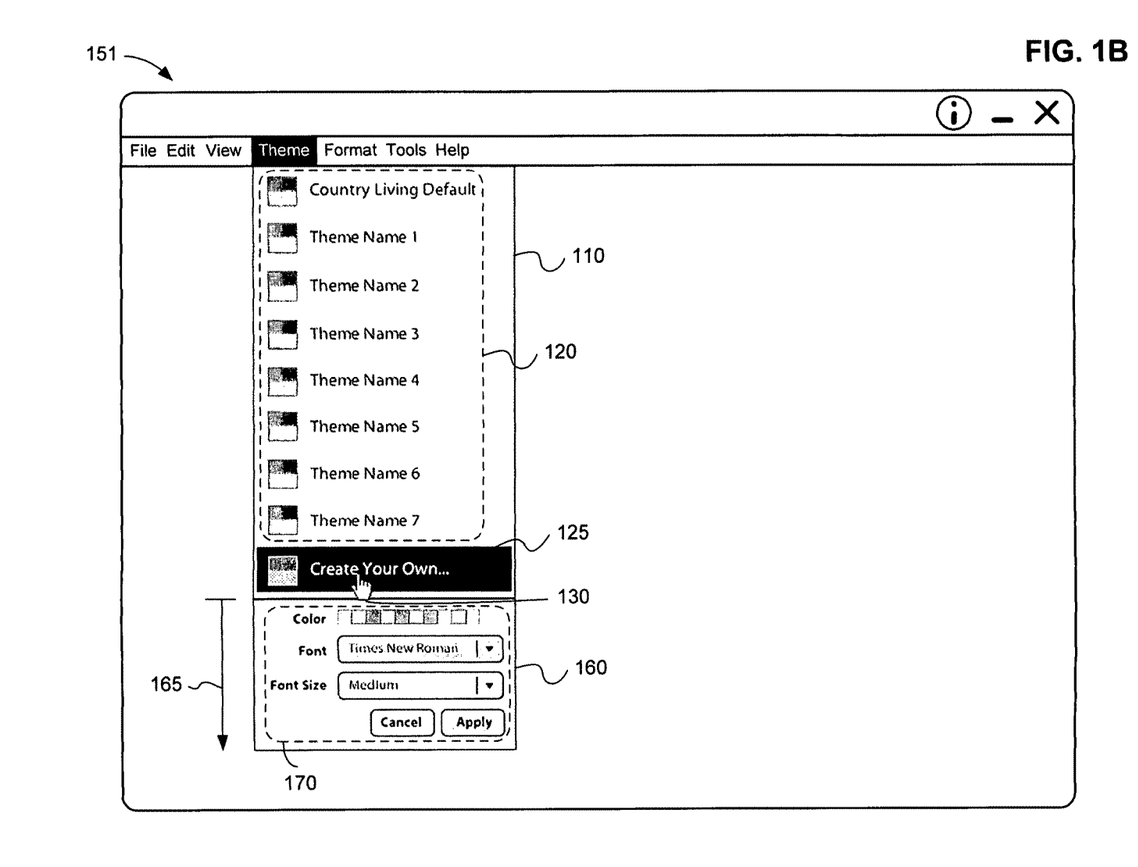
FIG. 1B illustrates another exemplary expandable user interface menu.

FIG. 1B illustrates another exemplary expandable user interface menu. Here, application window 151 shows user interface menu 110 with an expanded menu portion 160. Menu portion 160, when expanded in the direction of arrow 165, shows additional input controls 170. For example, menu portion 160 may be associated with menu item 125. Selecting menu item 125 (e.g., using control pointer 130 or another control) triggers menu 110 to be expanded with menu portion 160.

In some examples, one or more parameters associated with a menu item (e.g., menu item 125) may be used to determine various aspects of an expandable user interface menu. Parameters associated with a menu item may be the type of a menu item (e.g., ellipses or action), the position of a menu item in a menu, the level of additional user input (e.g., one piece of data or more than one piece of data), the form of data (e.g., text data, selection list, checkbox, or other form), and other properties. For example, the size of menu portion 160 may be based on the level of additional user input used to customize menu item 125. Here the level of additional user input, as indicated by input controls 170, uses "Color" checkboxes, a "Font" list, and a "Font Size" list. Further, menu portion 160 may be designed to use minimal amount of display space to minimize the covering of application window 101 and to minimize interrupting a user's focus on the current task. For example, the number and sizes of input controls 170 may be used to determine a layout of menu portion 160.

In some examples, the direction of expansion may be based on one or more parameters associated with menu item 125. For example, menu portion 160 may be expanded downwards in the direction shown by arrow 165. In other examples, menu portion 160 may be expanded substantially adjacent to menu 110 in another direction (not shown), such as to the right of, to the left of, or above menu 110. Menu portion 160 may be moved, either independent of menu 110, or in unison with menu 110. For example, after menu portion 160 is expanded and displayed, a user may move menu portion 160 to another location within, overlapping, or outside application window 151.

Input controls 170 may be any controls designed to collect, accept, or otherwise gather user input. There may be any number of input controls, such as one, two, three, five, eight, 15 or more. In some examples, input controls 170 may be any combination of one or more checkboxes, selection boxes, dropdown lists, selection lists, buttons (including radio buttons), input fields, widgets, elements, and other structures. In other example, one or more input controls may be ellipses input controls (i.e., causing another menu portion to be expanded with additional input controls). An input control may be accompanied by a description, such as "Color," "Font," or "Font Size." For example, application window 151 may be showing a menu for selecting font displaying themes. When menu portion 160 is expanded with input controls 170, input controls 170 may include one or more "Color" checkboxes for selecting one or more theme colors, a "Font" dropdown list of font names for selecting a font, a "Font Size" list for selecting a font size, a button to confirm any input entered (e.g., "Apply," "OK," or "Commit"), and a "Cancel" button to cancel and close menu portion 160. In some examples, expanded menu portion 160 may include fewer or more input controls than shown or other input controls. Further, menu portion 160 may include output controls, for example, providing instructions, warnings, descriptions, or other information.

In some examples, data entered via input controls 170 may be associated with menu item 125, which caused input controls 170 to be presented. Input data via input controls 170 may be any form of data, such as text, ASCII characters, binary bits, bytes, words, symbols, objects, or data of another form. Data entered via input controls 170 may be stored for other uses or for used by other menu items or controls.

In some examples, data entered via input controls 170 may be used as default values by input controls 170 in a later time. Having the ability to remember and reuse data values in a later time allows users to customize an ellipse menu item (e.g., menu item 125). For example, a user may customize menu item 125 by using input controls 170 to check a red color checkbox, select a Times New Roman font, or select a medium font size. The next time the user selects menu 125, menu portion 160 may expand to show input controls 170 with a red color checkbox checked by default, a Times New Roman font selected by default, or a medium font size selected by default. The user may accept or change any of the default values, which may further appear as default values in a subsequent activation of menu item 125.

Note that as users interact with one or more input controls 170 (other than pressing "Cancel" or "Apply"), menu 110 remains displayed along with menu portion 160. Menu items in menus 110 (e.g., menu items 120) remains displayed and available for selection. For example, after selecting menu item 125, which causes menu portion 160 to be expanded, a user may have an option to select one of menu items 120. Keeping menu items 120 and input controls 170 available for selection at the same time preserves or otherwise retains the context of menu 110 in its expanded state. Further, having menu 110 and menu portion 160 opened may allow a user to continue to focus on the user's task without interruptions, visual or mental.

FIG. 2 illustrates an alternative exemplary expandable user interface menu. Here, application window 201 includes menu 203 having menu items 205. Some of menu items 205 may be submenu menu items. When a submenu menu item is selected, for example, the "Font Size >" menu item, menu 210 is displayed with menu items 220 and 225. Menu items 220 and 225 each represents a function (i.e., choosing a font size) associated with the "Font Size" menu 210. When menu item "Other . . . " 225 is selected, menu 210 expands with menu portion 260, for example, in the direction shown by arrow 265. Menu portion 260 includes input controls 270.

With respect to menus in graphical user interface, a "submenu" refers to a menu (e.g., menu 210) that is activated from another menu (e.g., menu 203). A first-level submenu refers to a submenu of a menu, which itself is not a submenu. A second-level submenu refers to a submenu of a first-level submenu. Generally, an N-level submenu refers to a submenu of a N-minus-one-level submenu. In some examples, menu 210 may be a submenu, such as a first-level submenu (i.e., submenu of menu 203), as shown. In other examples, menu 210 may be a second, third, fourth, or a deeper level of submenu (e.g., a submenu of a fourth-level submenu).

In some examples, one or more parameters associated with menu 210 may be used to determine various aspects of an expandable user interface menu. Parameters associated with menu 210 may be the size, position, and dimensions of the menu, the number of menu items 220 and 225, the size, position, and dimensions of application window 201 in which the menu 210 is shown, and other properties associated with menu 210. For example, when an input is received for selecting menu item 225, one or more parameters associated with menu 210 are determined before expanding menu 210. In some examples, if there is insufficient space, for example, between the bottom edge of menu 210 and the bottom border of application window 201, menu portion 260 may be expanded to the right or left of menu 210 instead of downwards as shown.

In some examples, one or more selection may be performed by keyboard shortcuts. For example, a user may use keyboard shortcuts to select the "Format" menu 203, the "Font Size >" menu 210, or the "Other . . . " menu item 225, which causes menu portion 260 to be expanded and displayed with input controls 270. Here, a text box input control 270 may be interfaced by a keyboard or by a GUI control (e.g., control pointer 130, FIG. 1B). For example, a user may type in a number (e.g., "86") to the text box input control 270 or use a GUI control to interface the text box input control 270 (e.g., manipulate the arrows shown next to the input control) to arrive at a desirable data (e.g., "86"). To accept the entered data (i.e., "86"), a user may activate the "Apply" input control 270 (e.g., with a GUI control or keyboard shortcut). Again, menu items 220 may remain displayed, providing a user an option of selecting one of the given font sizes presented (i.e., displayed) as menu items 220. Notice the small amount of display space used by menu portion 260 to display input controls 270. Here, parameters such as the number of input controls 270 and the sizes of input controls 270 may be used to determine a layout of menu portion 260 to minimize or reduce any disruptions to the user experience.

Figure 3A:
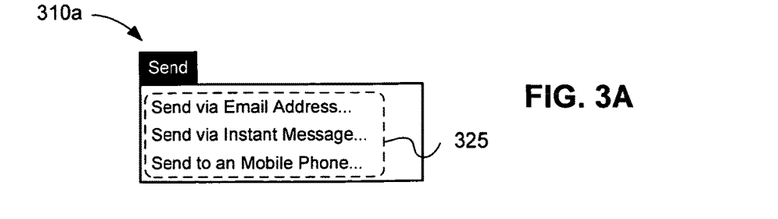
FIG. 3A illustrates another alternative exemplary expandable user interface menu.

FIG. 3A illustrates another alternative exemplary expandable user interface menu. Here, menu 310a, which may be a submenu, shows that ellipses or customizable menu items 325 may be positioned anywhere in a menu. Here, for example, menu items 325 shown are ellipses menu items. For illustration, expandable user interface menus may be implemented in an application that allows the sharing of information (e.g., cooking recipes). For example, information may be shared or sent by email, instant messaging ("IM"), mobile device communication, or another type of communication media, application, or service.

Figure 3B:
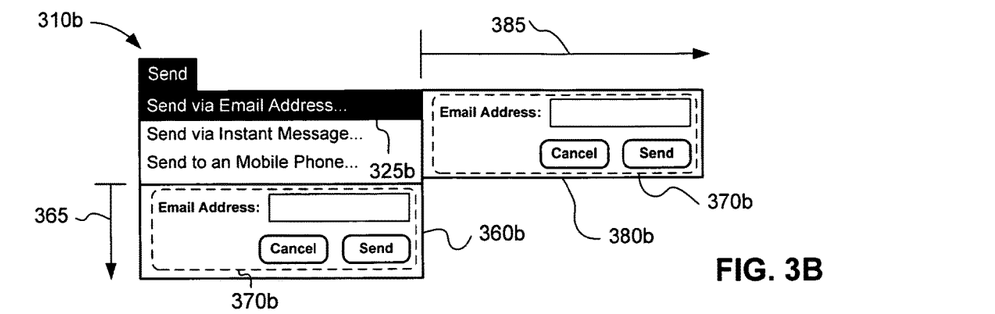
FIG. 3B illustrates a further alternative exemplary expandable user interface menu.

FIG. 3B illustrates a further alternative exemplary expandable user interface menu. Here, menu 310b shows a selection of a first menu item 325b being ellipses menu items. In some examples, selecting a first menu item 325b being an ellipses menu item may cause a menu portion 360b to be expanded downwards from menu 310b, as shown by arrow 365. Menu portion 360b includes, for example, a text box input control 370b for a user to enter an email address. An input control 370b to accept the entered text data (i.e., an email address) may be labeled "Send." In other examples, a menu portion, such as menu portion 380b, may be expanded in another direction, such as that shown by arrow 385. Determining whether to expand menu portion 370b in the direction of arrow 365 or 385 or another direction may be based on, for example, a position parameter of menu item 325b (e.g., being a first menu item).

Figure 3C:
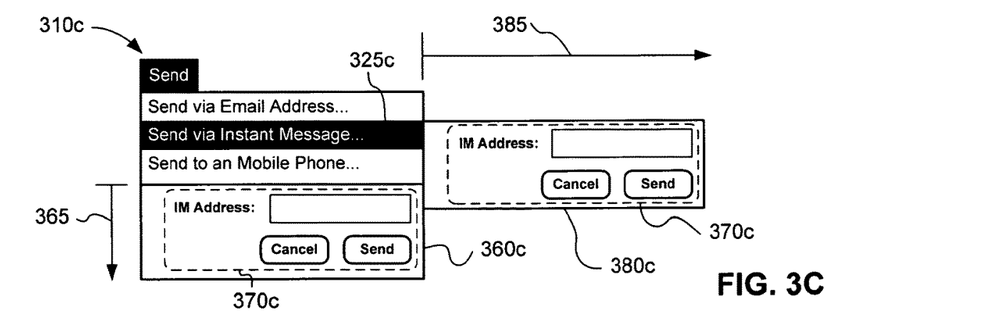
FIG. 3C illustrates yet another alternative exemplary expandable user interface menu.

FIG. 3C illustrates yet another alternative exemplary expandable user interface menu. Here, menu 310c shows a selection of a middle menu item 325c being ellipses menu items. A middle menu item is any menu item that is not the first or last menu item. In some examples, selecting a middle menu item 325c being an ellipses menu item may cause a menu portion 360c to be expanded downwards from menu 310c, as shown by arrow 365. Menu portion 360c includes, for example, a text box input control 370c for a user to enter an IM address. In other examples, a menu portion, such as menu portion 380c, may be expanded in another direction, such as that shown by arrow 385. Determining where to expand menu portion 370c may be based on, for example, one or more parameters associated with menu 310c. For example, parameters relating to the size and position of menu 310c with respect to an application window (not shown) may determine menu portion 360c to expand in the direction of 365, 385, or another direction.

Figure 3D:
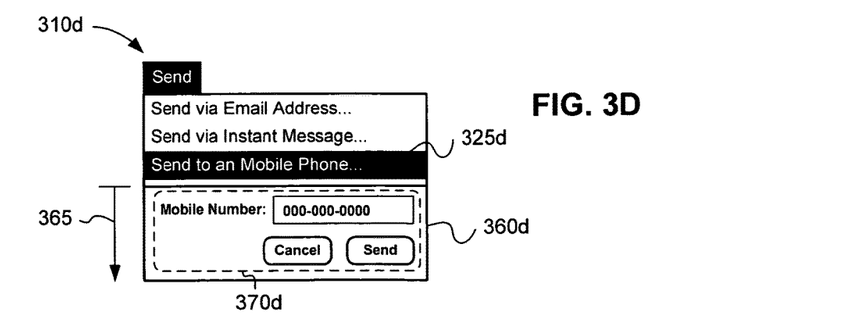
FIG. 3D illustrates still another alternative exemplary expandable user interface menu.

FIG. 3D illustrates still another alternative exemplary expandable user interface menu. Here, menu 310d shows a selection of another menu item 325c being ellipses menu items. Here, menu portion 360d is shown expanding downwards in the direction of arrow 365. Menu portion 360d includes, for example, an input control 370d for a user to enter a mobile telephone number. In some examples (not shown), menu portion 360d may be expanded differently.

In general, a menu portion may be expanded substantially adjacent to a menu in any location or in any direction (e.g., above, below, to the right, to the left, or near a corner of a menu). Again, a menu, a menu portion, or both may be moved to any location, such as any location within, overlapping, or outside an application window. In the examples provides, not all features and properties are included. In other examples, there may be additional features and properties. The above-described user interface menus, menu items, menu portions, input controls, output controls, input data, or user interface elements may be varied in number, design, configuration, implementation, structure, function, or other aspects and are not limited to the examples shown and described.

Figure 4A:
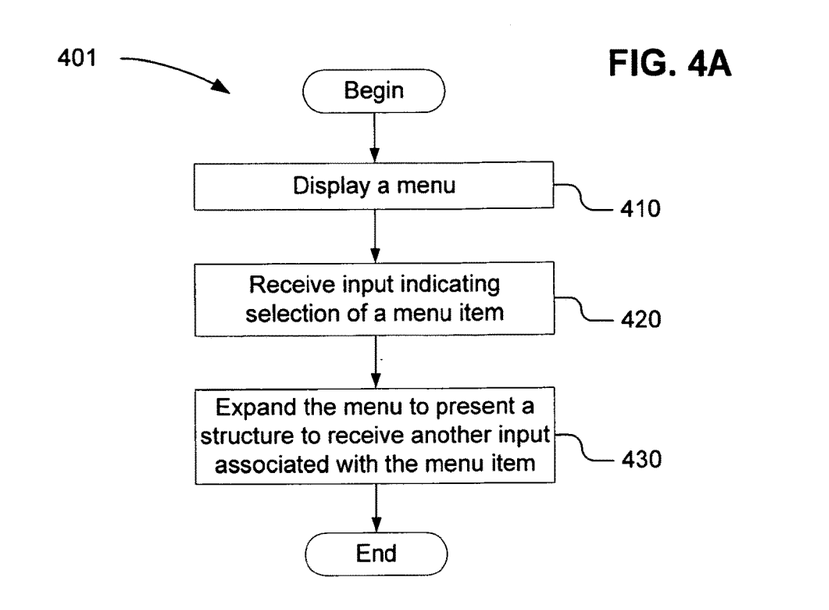
FIG. 4A is a flow diagram of an exemplary process for expandable user interface menu.

FIG. 4A is a flow diagram of an exemplary process for expandable user interface menu. Here, process 401 is suitable for implementation as, for example, a computer program code, software instructions, firmware, circuitry, logic, or hardware. A user interface ("UI") menu or submenu is displayed (410). The menu may include an ellipses or customizable menu item in any position of the menu, such as at the beginning, in the middle, or at the end of the menu. The menu may have one or more other menu items, which may be of any type (e.g., action, ellipses, submenu, or other). An input is received indicating selection of, for example, an ellipses menu item (420). The input may come from any control, such as one described herein. The menu is expanded to display one or more input controls or structures to receive additional input associated with the selected ellipses menu item (430). For example, a menu portion may be expanded adjacent to the menu (e.g., below, above, to the right, or to left of the menu). The input controls may be any controls (e.g., GUI widgets), such as those described above. Users may enter data to the input controls associated with the selected ellipses menu item. Since the menu and the menu items contained therein remain displayed, users also have the option to select another menu item from the menu. In some examples, the above-described process may be varied in design, order, implementation, or other aspects, and is not limited to the examples shown and described.

Figure 4B:
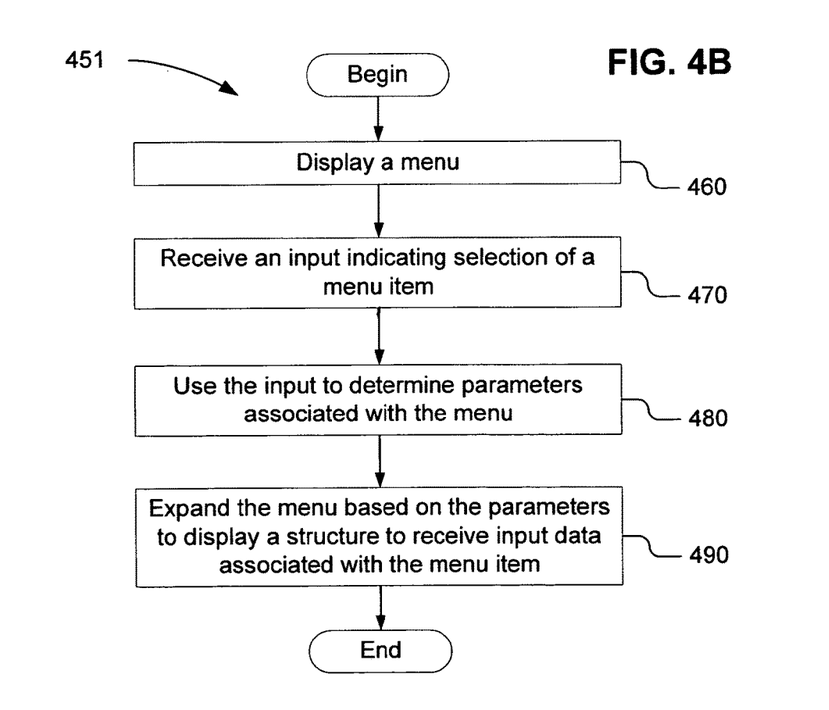
FIG. 4B is a flow diagram of an alternative exemplary process for expandable user interface menu.

FIG. 4B is a flow diagram of an alternative exemplary process for expandable user interface menu. A menu or submenu (i.e., user interface menu) is displayed (460). The menu may include a customizable or ellipses menu item in any position of the menu, such as at the beginning, in the middle, or at the end of the menu. The menu may have one or more other menu items, which may be of any type (e.g., action, customizable, submenu, or other). An input is received indicating selection of a customizable menu item (470). The input may come from any control, such as one described herein. The input is used to determine one or more parameters associated with the menu (e.g., the size, position of the menu) (480). The menu is expanded based on one or more parameters to display one or more input controls or structures associated with the selected customizable menu item (490). For example, a menu portion may be expanded adjacent to the menu (e.g., below, above, to the right, or to left of the menu). Data received through the input controls or structures are associated with the selected customizable menu item. Throughout the process, the user interface menu and the included menu items remain displayed, allowing users the option to select another menu item from the menu. In some examples, the above-described process may be varied in design, order, implementation, or other aspects, and is not limited to the examples shown and described. Further, process 451 may be suitable for implementing as programming instructions or in an application, such as the exemplary application described in FIG. 5.

Figure 5:
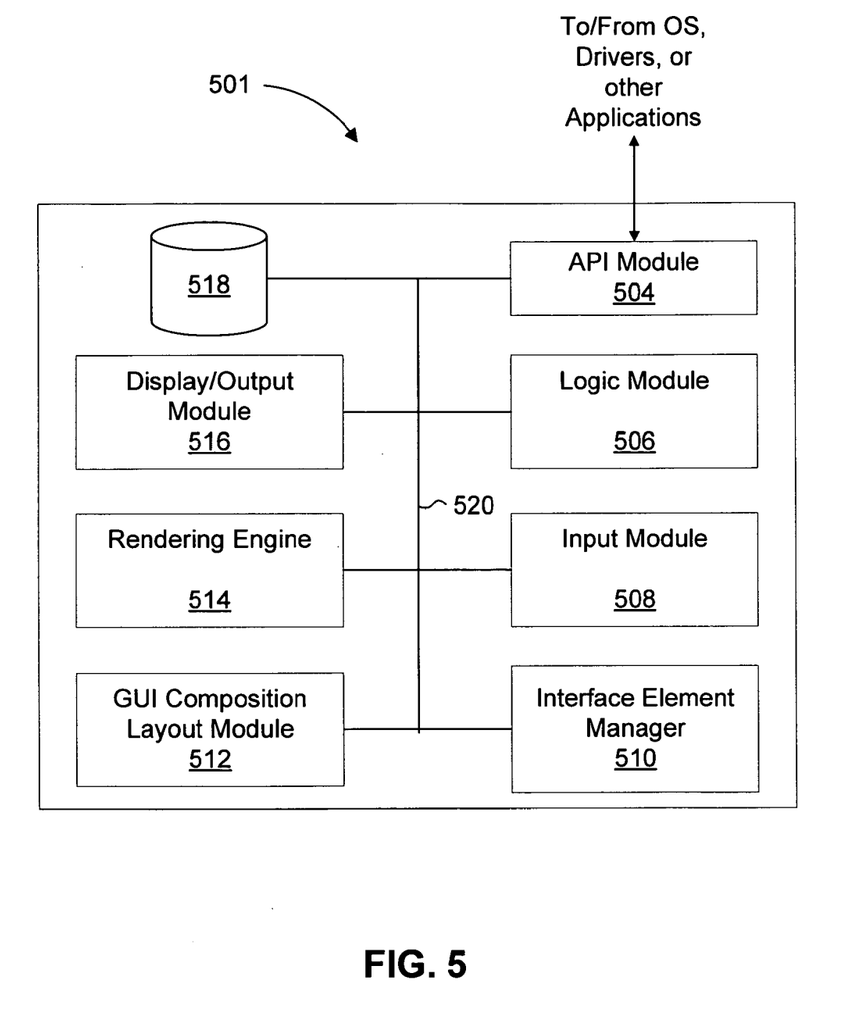
FIG. 5 illustrates an exemplary application architecture for expandable user interface menu.

FIG. 5 illustrates an exemplary application architecture for expandable user interface menu. Here, application 501 includes application programming interface ("API") module 504, logic module 506, input module 508, interface element manager 510, graphical user interface ("GUI") composition layout module 512, rendering engine 514, display/output module 516, repository 518, and bus 520. In some examples, API module 504, logic module 506, input module 508, interface element manager 510, GUI composition layout module 512, rendering engine 514, display/output module 516, and repository 518 may be in data communication with each other, other applications, operating systems, drivers, or the like using bus 520, which may be a logical or physical coupling configured to allow data transfer between processes such as those described. Further, API module 504 may be in data communication with one or more external processes (not shown) using actual or physical ports (not shown), processes, or other data interfaces. Other external processes may include, but are not limited to operating systems ("OS"), drivers (e.g., input/output, disk drive, and graphic circuit drivers), firmware, applications, state machines, virtual state machines, and others.

In some examples, when data is received by API module 504, it may be transferred to one or more other modules (e.g., logic module 506, input module 508, interface element manager 510, GUI composition layout module 512, rendering engine 514, display/output module 516, repository 518, and others) using bus 520. For example, after display/output module 516 has displayed one or more user interface elements (e.g., a menu, menu item, or menu portion), API module 504 may receive from an input driver (not shown) input data, for example, to select a menu, select a menu item, move a menu or menu portion, interact with an input control, or otherwise interact with an interface element. The input data may be transferred to input module 508 for interpretation (e.g., determining which element is being interfaced or a parameter associated with a menu or menu item) and transferred to display/output module 516 to display the interface element, for example, expanding a menu portion with one or more input controls.

In some examples, logic module 506 may be configured to control the data flow through bus 520 and direct the services provided by API module 504, input module 508, interface element manager 510, GUI composition layout module 512, rendering engine 514, display/output module 516, and repository 518 in order to implement an expandable user interface menu according to various embodiments. For example, data previous enter via one or more input controls may be stored in repository 518. In response to an input selecting a customizable menu item, logic module 506 may direct interface element manager 510 to retrieve previously entered input control data from repository 518, direct GUI composition layout module 512 to layout a menu portion with one or more input controls set, as default values, to the previously entered input control data, and direct display/output module 516 to display an expandable user interface menu with a menu portion expanded.

Application 501 and the above-described modules and elements may be varied in design, function, configuration, implementation, or other aspects and are not limited to the descriptions provided above.

Figure 6:
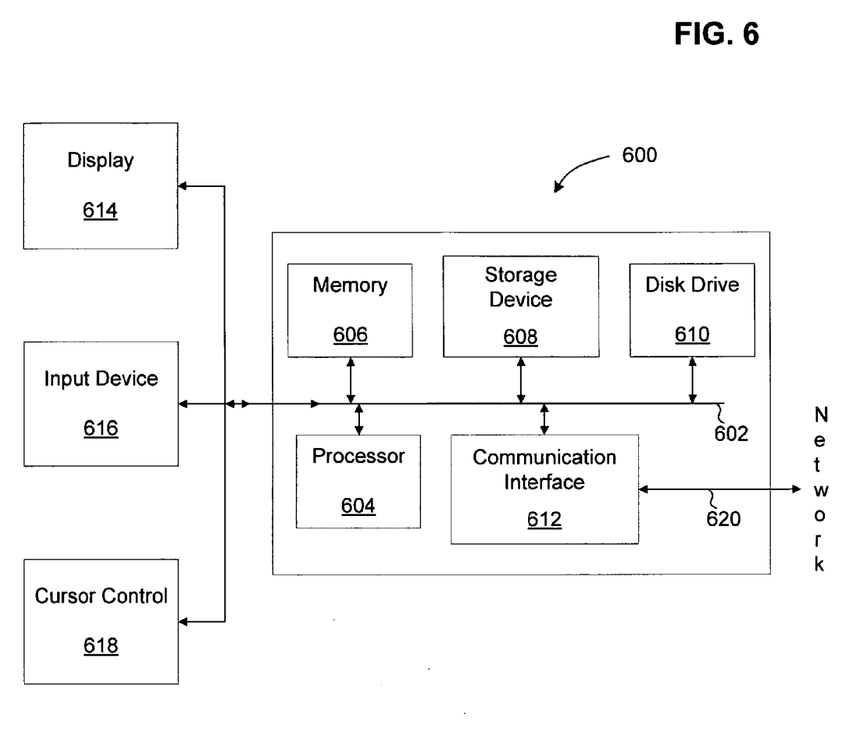
FIG. 6 illustrates an exemplary computer system suitable for implementing an expandable user interface menu.

FIG. 6 illustrates an exemplary computer system suitable for implementing an expandable user interface menu. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). Processor 604 can be a single-core, dual-core, or multi-core processor; and processor 604 can be a processor in a multi-processor environment or a distributed processing environment.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
   displaying, in a user interface, a menu comprising (a) a group of two or more vertically-arranged menu items, each of which is associated with a value corresponding to a parameter, and (b) a user-customizable menu item;
   receiving a first input indicating selection of the user-customizable menu item; and
   in response to receiving the first input, expanding the menu vertically, thereby presenting a structure that includes a plurality of user interface elements, and that is vertically aligned with the group of two or more vertically-arranged menu items, wherein at least one of the user interface elements included in the structure is configured to receive a second input that defines a user-specified value corresponding to the parameter;

wherein receipt of the second input defines the user-specified value but does not cause the menu, the user-customizable menu item, or the structure to be removed from the user interface;

wherein the second input includes at least one of (a) data entered in a text entry field provided within the structure and (b) a selection made via a supplementary dropdown menu provided within the structure;

wherein at least one of the user interface elements included in the structure is configured to receive a third input associated with the user-customizable menu item, receipt of which causes the user-specified value defined by the second input to be assigned to the parameter;

wherein receipt of the third input also causes the menu, the user-customizable menu item, and the structure to be removed from the user interface; and wherein the method further comprises displaying a modified menu after the third input is received, wherein the modified menu includes an additional menu item that was not initially included in the menu, and wherein the additional menu item corresponds to functionality associated with the second input.

2. The method of claim 1, wherein
the structure includes a user interface element corresponding to a cancellation operation, and
selection of the user interface element corresponding to the cancellation operation causes the menu, the user-customizable menu item, and the structure to be removed from the user interface.

3. The method of claim 1, wherein the menu and the structure have a common width.

4. The method of claim 1, wherein the first input comprises hovering a selection pointer over the user-customizable menu item.

5. The method of claim 1, wherein the structure is configured to receive the second input until the third input is received.

6. A computer program product embodied in a non-transitory computer-readable medium and comprising computer instructions that, when executed:
display, in a user interface, a dropdown menu comprising (a) a group of two or more vertically-arranged menu items, each of which is associated with a value corresponding to a parameter, and (b) a user-customizable menu item;
receive a first input indicating selection of the user-customizable menu item; and
in response to receiving the first input, expand the dropdown menu vertically, thereby presenting an expanded dropdown menu that includes a plurality of user interface elements, and that is vertically aligned with the group of two or more vertically-arranged menu items;
wherein at least one of the user interface elements included in the expanded dropdown menu is configured to receive a second input that defines a user-specified value corresponding to the parameter;
wherein receipt of the second input defines the user-specified value but does not cause the dropdown menu, the user-customizable menu item, or the expanded dropdown menu to be removed from the user interface;
wherein the second input includes at least one of (a) data entered in a text entry field provided within the expanded dropdown menu and (b) a selection made via a supplementary dropdown menu provided within the expanded dropdown menu;

wherein at least one of the user interface elements included in the expanded dropdown menu is configured to receive a third input associated with the user-customizable menu item, receipt of which causes the user-specified value defined by the second input to be assigned to the parameter;

wherein receipt of the third input also causes the dropdown menu, the user-customizable menu item, and the expanded dropdown menu to be removed from the user interface; and wherein the computer program product, when executed, further displays a modified menu after the third input is received, wherein the modified menu includes an additional menu item that was not initially included in the dropdown menu, and wherein the additional menu item corresponds to functionality associated with the second input.

7. The computer program product of claim 6, wherein
the expanded dropdown menu includes a user interface element corresponding to a cancellation operation, and
selection of the user interface element corresponding to the cancellation operation causes the dropdown menu, the user-customizable menu item, and the expanded dropdown menu to be removed from the user interface.

8. The computer program product of claim 6, wherein the expanded dropdown menu and the dropdown menu have a common width.

9. The computer program product of claim 6, wherein the first input comprises hovering a selection pointer over the user-customizable menu item.

10. The computer program product of claim 6, wherein the expanded dropdown menu is configured to receive the second input until the third input is received.

11. A system comprising:
a memory device configured to store processing instructions and data associated with a menu that includes (a) a group of two or more menu items, each of which is associated with a value corresponding to a parameter, and (b) a user-customizable menu item;
a processor that is operatively coupled to the memory device, and that is configured to execute the processing instructions stored in the memory device, wherein the processing instructions, when executed, cause the processor to implement an expandable menu user interface;
a display device coupled to the processor and configured to display the expandable menu user interface implemented by the processor; and
a physically implemented control configured to receive user input and provide the received user input to the processor,
wherein implementing the expandable menu user interface comprises (a) causing the display device to display a vertically-arranged list of the two or more menu items in the menu, (b) receiving, via the physically implemented control, a first user input indicating selection of the user-customizable menu item, and (c) in response to receiving the first user input, expanding the menu vertically, thereby presenting an expanded menu that includes a plurality of user interface elements and that is vertically aligned with the existing vertically-arranged list;
wherein at least one of the user interface elements included in the expanded menu is configured to receive a second user input the defines a user-specified value corresponding to the parameter;

wherein receipt of the second user input defines the user-specified value but does not cause the menu, the user-customizable menu item, or the expanded menu to be removed from the display device;

wherein the second user input includes at least one of (a) data entered in a text entry field provided within the expanded menu and (b) a selection received via a supplementary dropdown menu provided within the expanded menu;

wherein at least one of the user interface elements included in the expanded menu is configured to receive, via the physically implemented control, a third user input associated with the user-customizable menu item, receipt of which causes the user-specified value defined by the second user input to be assigned to the parameter;

wherein receipt of the third user input also causes the menu, the expanded menu, and the user-customizable menu item to be removed from the display device; and wherein implementing the expandable menu user interface further comprises displaying a modified menu after the third user input is received, wherein the modified menu includes an additional menu item that was not initially included in the menu, and wherein the additional menu item corresponds to functionality associated with the second user input.

12. The system of claim 11, wherein the user-customizable menu item and the expanded menu remain displayed, and the user interface elements remain configured to receive the second user input, until the third user input is received.

13. The system of claim 11, wherein the expanded menu comprises a box configured to receive the second and third user inputs.

14. The system of claim 11, wherein receiving the first user input further comprises generating a signal to display the expanded menu when a selection element is hovered over the user-customizable menu item.

* * * * *